May 22, 1934. H. N. WRIGHT 1,960,132
ADJUSTABLE FURROW WIDTH CONTROLLER HITCH
Filed Dec. 18, 1933
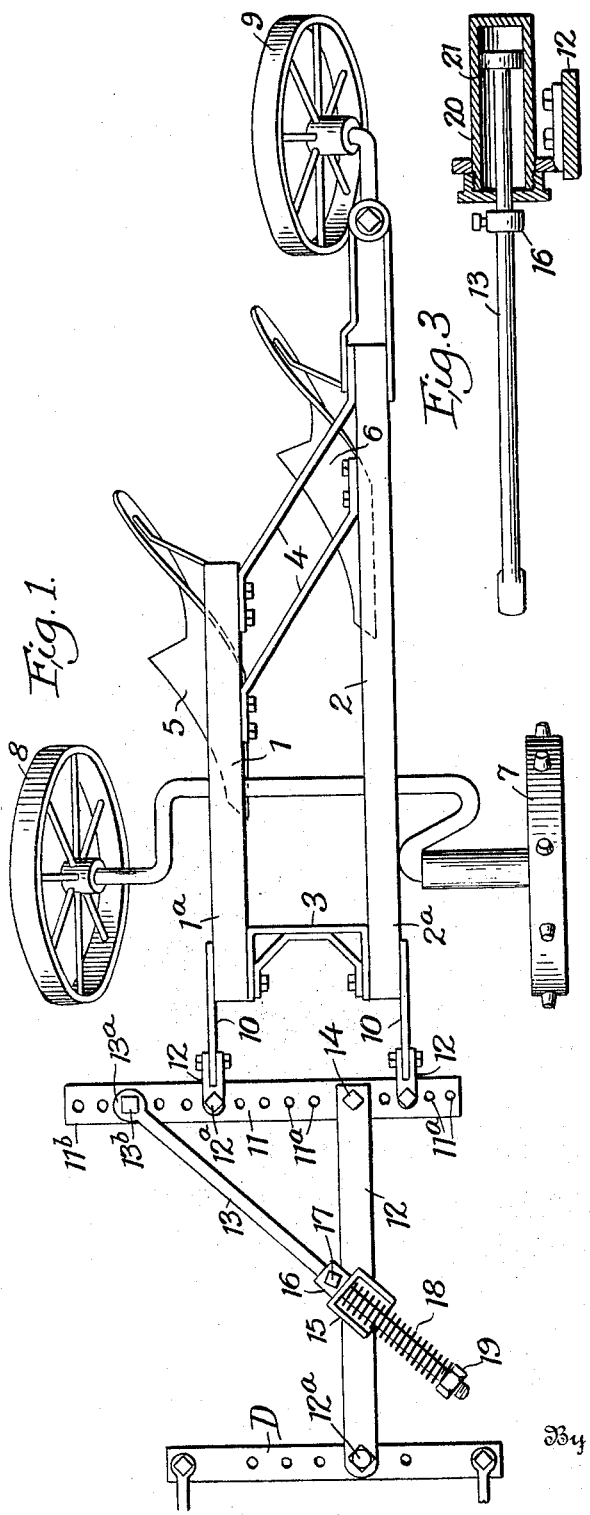
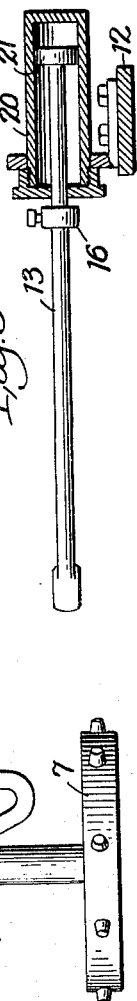
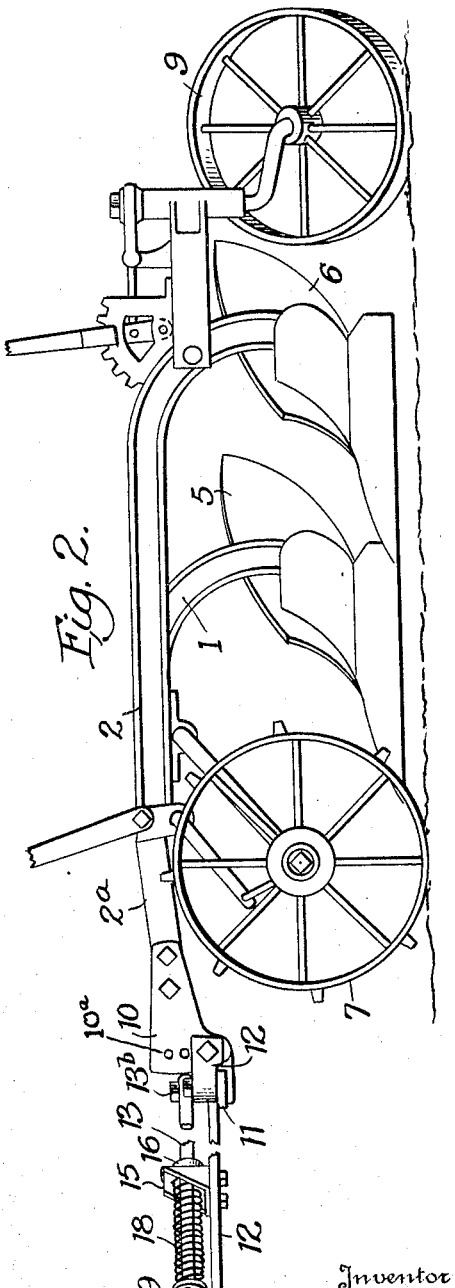

Patented May 22, 1934

1,960,132

UNITED STATES PATENT OFFICE 1,960,132

ADJUSTABLE FURROW WIDTH CONTROLLER HITCH

Hazelet N. Wright, Pennville, Ind.

Application December 18, 1933, Serial No. 702,983

12 Claims. (Cl. 97—103)

This invention is a novel adjustable controller hitch, particularly adapted for tractor or power drawn wheeled gang plows and the like, said hitch automatically maintaining a constant furrow width or spacing for which same is adjusted, whereby all of the gangs, where two or more are connected together, will run true to line notwithstanding changes in the consistency of the soil. Arable soils of different kinds are of different consistencies; for instance, jack wax and white oak soils differ widely with regard to plow resistance, and as the plow share advances into soils of different consistencies the spacing of the furrows will ordinarily become narrower or wider due to lateral shifting of the rear end of the plow frame. Plow manufacturers have heretofore been unable to produce hitches for gang plows which would overcome variation in furrow spacings, and substantially uniform furrows have been difficult to secure when using such gang plows.

The principal object of my invention is to provide a novel hitch connecting the plow frame and tractor or prime mover which will automatically prevent lateral shifting of the rear end of the plow frame, said means including a diagonal rod connecting the drawbar and pull bar of the hitch, said rod having a spring connection with the pull bar whereby as the angularity of the plow frame with respect to the pull bar increases, the spring will be compressed an amount proportional to the twist, the spring thereby tending to maintain the frame in proper alignment with the pull bar and tractor. The consistency of the soil automatically bring into action the spring means in the hitch, thereby controlling the width or spacing and producing a practically uniform furrow width or spacing in all kinds of soils.

I will explain the invention with reference to the accompanying drawing which illustrates several practical embodiments thereof to enable others familiar with the art to adopt and use the same; and will summarize in the claims, the novel features of construction, and novel combinations of parts, for which protection is desired.

In the drawing:

Fig. 1 is a plan view of a conventional gang plow showing my novel adjustable controller hitch connecting the plow with the draw bar of a tractor.

Fig. 2 is a side elevation thereof.

Fig. 3 is a plan view showing a modified form of hitch.

As shown, the frame of the gang plow consists of plow beams 1 and 2 having their forward portions bent downwardly as at 1a, 2a. Beams 1 and 2 are spaced apart by cross bars 3 and 4 located adjacent the bends of the beams, said bars being rigidly bolted or otherwise secured to the plow beams. Plow shares 5 and 6 are carried by beams 1 and 2 respectively and a land wheel 7, a furrow wheel 8, and a rear wheel 9 support the plow frame. To the forward ends of the beams 1 and 2 are bolted clevises 10, draft being applied to the plow frame through a drawbar 11, a pull bar 12, and a brace bar 13. Drawbar 11 is attached to the clevises 10 by shackles 12. Clevises 10 are provided with series of vertically disposed perforations 10a therein for adjusting the elevation of shackles 12. Pull bar 12 has its rear end attached to drawbar 11 by bolt 14 passing through any one of a series of perforations 11a. Pull bar 12 is preferably connected to the plow drawbar 11 at a point adjacent the plow beam 2 which is further removed from the furrow wheel 8. Pull bar 12 is pivotally connected by bolt 12a with the drawbar D of the tractor (not shown), said bolt passing through any one of a series of perforations in drawbar D.

The end of the drawbar 11 adjacent the furrow wheel 8 extends, as at 11b, beyond the adjacent plow beam 1, and is also provided with longitudinally disposed perforations 11a, for a purpose hereinafter explained. Adjustably connected to one of the perforations 11a in the extended end 11b of the drawbar 11 is a brace bar 13 having an eye 13a for the reception of a bolt 13b transfixing the eye and drawbar. Brace bar 13 extends diagonally forward towards the tractor and crosses the pull bar 12. An angle bracket 15 is fixed upon the pull bar 12 and brace bar 13 passes loosely through a perforation in the bracket whereby the brace bar 13 may telescope the bracket. An adjustable collar 16 on the brace bar 13 limits the amount of entry of the brace bar 13 into the bracket and hence limits the forward swinging movement of the drawbar 11, said collar 16 being adjusted by set screw 17. A coil spring 18 is mounted on the outer end of brace bar 13, on the side of the bracket 15, opposite the collar 16, said spring being retained thereon by a nut 19 on the threaded outer end of the brace bar.

The brace bar 13, with bracket 15, collar 16, and resisting means 18, constitute the adjustment feature of the hitch to automatically regulate the width or spacing between the furrows as the plow passes from soft to hard soil, and vice versa. The adjustment of the collar 16 on bar 13, and the compression of spring 18 by adjustment of the nut 19 on the bar 13, permits the desired width or spacing between the furrows to be regulated.

In Fig. 3 a modification is shown in which the hitch bar 12 has mounted thereon a cylinder 20 in place of the bracket 15 of Figs. 1 and 2; and a piston 21 mounted on the end of brace bar 13 slidably engages cylinder 20. The cylinder may be filled with air or gas and the compressed column of air or gas functions as a spring to return the piston 21 to its normal position similarly to the spring 18 of Figs. 1 and 2.

In operation, when the gang plow is drawn by the tractor, with the furrow wheel 8 of the plow riding in the outermost furrow of the last turned course, if the shares 5 and 6 are acting in relatively soft soil there will be little tendency of the soil, acting through the plow shares, to deflect the rear ends of the plow beams 1 and 2 laterally away from said last turned course. When however the shares 5 and 6 encounter hard ground the plow frame has a tendency, due to the increased soil resistance on the shares, to pivot laterally on its wheels 7 and 8, causing the rear end of the frame to shift away from the previously turned furrow in which furrow wheel 8 is riding, thereby widening the spacing between the outermost furrow of the last turned course and the innermost furrow of the course being produce. By my novel hitch however the tendency of the frame to shift laterally is offset by the action of the spring 18 of cylinder 20, the resistance increasing in proportion with the change in angularity of drawbar 11 with respect to pull bar 12.

I claim:—

1. A hitch for plows having one or more plow beams; comprising a drawbar connected with a plow beam; a pull bar pivotally connected with the drawback; a member on the pull bar; a brace bar having one end pivotally connected with the drawbar and its other end engaged with the member; and resisting means whereby variations in relative angularity of the drawbar and pull bar will proportionally increase the resistance to such angular change.

2. In a hitch as set forth in claim 1, means for normally maintaining the drawbar and pull bar at substantially right angles to each other.

3. In a hitch as set forth in claim 1, said resisting means comprising a spring interposed between the member and a stop on the brace bar.

4. In a hitch as set forth in claim 1, said member comprising a cylinder; and said resisting means comprising a piston carried by the brace bar engaging the cylinder, and a fluid cushioning medium in the cylinder coacting with the piston.

5. A hitch for gang plows having a plurality of plow beams; comprising a drawbar connected with the plow beams; a pull bar pivotally connected with the drawbar; a member on the pull bar; a diagonally disposed brace bar having one end pivotally connected with the draw bar adjacent one end, and its other end engaged with the member; means on the brace bar engaging the member for limiting the forward movement thereof; and resisting means whereby as the brace bar is moved rearwardly the resistance will increase proportionally to such movement.

6. In a hitch as set forth in claim 5, said resisting means comprising a spring interposed between the member and a stop on the brace bar.

7. In a hitch as set forth in claim 5, said member comprising a cylinder; and said resisting means comprising a piston carried by the brace bar engaging the cylinder, and a fluid cushioning medium in the cylinder coacting with the piston.

8. A hitch for gang plows having a plurality of plow beams; comprising a drawbar connected with the plow beams; a pull bar pivotally connected with the drawbar; a member on the pull bar; a diagonally disposed brace bar having one end pivotally connected with the draw bar adjacent one end, and its other end engaged with the member; an adjustable collar on the brace bar engaging the member for limiting the forward movement of the brace bar; and resisting means connecting the brace bar and member whereby as the brace bar is moved rearwardly the resistance will increase proportionally to such movement.

9. In a hitch as set forth in claim 8, said resisting means comprising a coiled spring around the brace bar interposed between the member and a stop on the brace bar.

10. In a hitch as set forth in claim 8, said member comprising a cylinder; and said resisting means comprising a piston carried by the brace bar engaging the cylinder, and a fluid cushioning medium in the cylinder coacting with the piston.

11. A hitch for gang plows having a plurality of plow beams, comprising a drawbar connected with the plow beams; a pull bar pivotally connected with the drawbar; a bracket on the pull bar; a diagonally disposed brace bar having one end pivotally connected with one end of the drawbar and its other end telescoping the bracket; an adjustable collar on the brace bar adapted to engage the bracket and limit the forward swinging movement of the drawbar; and a spring interposed between the bracket and a nut on the outer end of the brace bar for normally drawing the brace bar outwardly to maintain an adjustable angularity between the draw and pull bars; said spring being compressed when the drawbar is swung rearwardly an amount proportional to the swing.

12. A hitch for gang plows having a plurality of plow beams, comprising a drawbar connected with the plow beams, a pull bar pivotally connected with the drawbar; a cylinder on the pull bar; a diagonally disposed brace bar having one end pivotally connected with one end of the drawbar; a piston on the other end of the brace bar engaging the cylinder; an adjustable collar on the brace bar adapted to engage the cylinder for limiting the forward swinging movement of the drawbar; and a fluid medium in the cylinder coacting with the piston for normally drawing the brace rod outwardly to maintain an adjustable angularity between the draw and pull bars; said medium being compressed when the drawbar is swung rearwardly an amount proportional to the swing.

HAZELET N. WRIGHT.